US009622077B2

United States Patent
Hughes et al.

(10) Patent No.: US 9,622,077 B2
(45) Date of Patent: *Apr. 11, 2017

(54) SYSTEMS AND METHODS FOR GEOLOCATION-BASED AUTHENTICATION AND AUTHORIZATION

(71) Applicant: MapQuest, Inc., Denver, CO (US)

(72) Inventors: Joseph D. Hughes, Lancaster, PA (US); Patrick McDevitt, Hanover, NH (US); Joseph Barbara, Middletown, PA (US)

(73) Assignee: Mapquest, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/928,553

(22) Filed: Oct. 30, 2015

(65) Prior Publication Data

US 2016/0073261 A1 Mar. 10, 2016

Related U.S. Application Data

(63) Continuation of application No. 14/066,478, filed on Oct. 29, 2013, now Pat. No. 9,253,198.

(51) Int. Cl.
*H04L 29/06* (2006.01)
*H04W 12/06* (2009.01)
(Continued)

(52) U.S. Cl.
CPC ............ *H04W 12/06* (2013.01); *G06F 21/31* (2013.01); *H04L 63/105* (2013.01);
(Continued)

(58) Field of Classification Search
CPC .................................................... H04W 12/06
See application file for complete search history.

(56) References Cited

U.S. PATENT DOCUMENTS 6,166,688 A   12/2000 Cromer et al.
8,508,332 B2   8/2013 Jones et al.
(Continued)

FOREIGN PATENT DOCUMENTS

EP   1653386 A2   5/2006
KR   100285729 B1 *  1/2001
(Continued)

OTHER PUBLICATIONS

Minch, Robert P. "Privacy issues in location-aware mobile devices."System Sciences, 2004. Proceedings of the 37th Annual Hawaii International Conference on. IEEE, 2004.*

(Continued)

*Primary Examiner* — Shawnchoy Rahman

(57) ABSTRACT

Systems and methods are provided for controlling the authentication or authorization of a mobile device user for enabling access to the resources or functionality associated with an application or service executable at the user's mobile device. The user or user's mobile device may be automatically authenticated or authorized to access application or system resources at the device when the current geographic location of the user's mobile device is determined to be within a preauthorized zone, e.g., based on a predetermined geo-fence corresponding to the preauthorized zone. A security level or amount of authorization credentials required to authorize a user for data access may be varied according any of a plurality of security levels, when the current or last known geographic location of the user's mobile device is determined to be outside the preauthorized zone.

19 Claims, 7 Drawing Sheets

(51) Int. Cl.
*G06F 21/31* (2013.01)
*H04W 4/02* (2009.01)

(52) U.S. Cl.
CPC ..... *H04W 4/021* (2013.01); *G06F 2221/2111* (2013.01); *G06F 2221/2113* (2013.01); *G06F 2221/2151* (2013.01)

(56) References Cited

U.S. PATENT DOCUMENTS

| | | |
|---|---|---|
| 8,869,305 B1 | 10/2014 | Huang |
| 9,373,112 B1 * | 6/2016 | Henderson ............. G06Q 20/40 |
| 2003/0105971 A1 | 6/2003 | Angelo et al. |
| 2004/0248653 A1 | 12/2004 | Barros et al. |
| 2007/0230440 A1 | 10/2007 | Joong |
| 2009/0195445 A1 | 8/2009 | DeHaas |
| 2012/0253957 A1 | 10/2012 | Bakshi |
| 2012/0329555 A1 * | 12/2012 | Jabara ................. G07F 17/3218 463/29 |
| 2013/0055370 A1 | 2/2013 | Goldberg et al. |
| 2013/0305320 A1 * | 11/2013 | Warrick ................ H04L 61/103 726/4 |
| 2015/0065172 A1 | 3/2015 | Do et al. |
| 2015/0121464 A1 | 4/2015 | Hughes |

FOREIGN PATENT DOCUMENTS

| | | |
|---|---|---|
| WO | WO 99/50734 A1 | 10/1999 |
| WO | WO 2014152618 A2 * | 9/2014 ............. G06Q 30/02 |

OTHER PUBLICATIONS

International Search Report and Written Opinion issued in corresponding International Application No. PCT/US2014/062636, mailed Mar. 9, 2015 (8 pages).

* cited by examiner

SYSTEMS AND METHODS FOR GEOLOCATION-BASED AUTHENTICATION AND AUTHORIZATION

CROSS-REFERENCE TO RELATED APPLICATIONS

This application is a continuation of pending U.S. application Ser. No. 14/066,478, filed Oct. 29, 2013, which is hereby incorporated herein by reference in its entirety.

TECHNICAL FIELD

The present disclosure relates generally to data access control for mobile devices, and particularly, to controlling authorization of mobile device users for accessing a functionality of one or more applications executable at their respective devices.

BACKGROUND

Mobile devices, such as smartphones, allow users to perform various types of tasks using specialized applications executing at their respective devices. Such a mobile application may be used, for example, to access the functionality of a web service hosted at a remote server via a mobile communication network. As the popularity of mobile devices continues to grow, users increasingly rely on these devices to perform everyday tasks including tasks that may involve access to secure content. For example, a mobile banking application executable at a user's mobile device may allow the user to submit login credentials and view account statements or initiate various other banking transactions.

Existing security protocols for a mobile application or web service generally require each user to register a new account and provide a unique set of login credentials in order to gain access to the functionality of the application or web service. However, users must now contend with a multitude of user accounts and associated login credentials required for accessing different applications and services in order to perform simple daily tasks. As a consequence, users may find performing such tasks at their respective mobile devices incredibly cumbersome.

SUMMARY OF THE DISCLOSURE

Embodiments disclose systems and methods for controlling authorization of mobile device users based on geographic location.

According to certain embodiments, computer-implemented methods are disclosed for controlling authorization of mobile device users based on geographic location. One method includes: responsive to receiving a first request for data access from a mobile device of a user via a network, requesting via the network a current geographic location of the mobile device; and upon receiving a response including the requested current geographic location of the mobile device, determining whether the current geographic location of the mobile device is within a predetermined authorization zone. When the current geographic location of the mobile device is determined to be within the predetermined authorization zone, the method includes: automatically authorizing the user of the mobile device for data access in accordance with the first request. When the current geographic location of the mobile device is determined not to be within the predetermined authorization zone, the method includes: determining a security level for the user based on the current geographic location of the mobile device; requesting authorization information for manual authorization of the user based on the determined security level; and upon receiving the requested authorization information from the mobile device, authorizing the user of the mobile device for data access in accordance with the first request based on the received authorization information.

According to certain embodiments, computer-implemented methods are disclosed for controlling authorization of mobile device users based on geographic location. One method includes: responsive to receiving input from a user requesting access to an application executable at a mobile device, determining a current geographic location of the mobile device; and determining whether the current geographic location of the mobile device is within a predetermined authorization zone. When the current geographic location of the mobile device is determined to be within the predetermined authorization zone, the method includes automatically authorizing the user of the mobile device for access to the application executable at the mobile device in accordance with the input received from the user. When the current geographic location of the mobile device is determined not to be within the predetermined authorization zone, the method includes: determining a security level for authorization of the user for access based on the current geographic location of the mobile device; requesting authorization information from the user for manual authorization of the user based on the determined security level; and upon receiving input from the user including the requested authorization information, authorizing the user for access based on the received authorization information.

According to certain embodiments, systems are disclosed for automatic authorization of mobile device users based on geographic location. One system includes a memory having processor-readable instructions stored therein; and a processor configured to access the memory and execute the processor-readable instructions, which when executed by the processor configures the processor to perform a plurality of functions, including functions to: receive a first request for data access from a mobile device of a user via a network; request via the network a current geographic location of the mobile device; and determine whether the current geographic location of the mobile device is within a predetermined authorization zone based on a received response including the requested current geographic location of the mobile device. When the current geographic location of the mobile device is determined to be within the predetermined authorization zone, the method includes automatically authorize the user of the mobile device for data access in accordance with the first request. When the current geographic location of the mobile device is determined not to be within the predetermined authorization zone, the method includes: determining a security level for the user based on the current geographic location of the mobile device; requesting authorization information for manual authorization of the user based on the determined security level; and authorizing the user of the mobile device for data access in accordance with the first request based on authorization information received from the mobile device.

According to certain embodiments, a computer readable medium is disclosed as storing instructions that, when executed by a computer, cause the computer to perform a method to: receive a first request for data access from a mobile device of a user via a network; request via the network a current geographic location of the mobile device; and determine whether the current geographic location of the mobile device is within a predetermined authorization zone based on a received response including the requested current geographic location of the mobile device. When the current geographic location of the mobile device is determined to be within the predetermined authorization zone, the method automatically authorizes the user of the mobile device for data access in accordance with the first request. When the current geographic location of the mobile device is determined not to be within the predetermined authorization zone, the method: determines a security level for the user based on the current geographic location of the mobile device; requests authorization information for manual authorization of the user based on the determined security level; and authorizes the user of the mobile device for data access in accordance with the first request based on authorization information received from the mobile device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DESCRIPTION OF THE EMBODIMENTS

Figure 1:
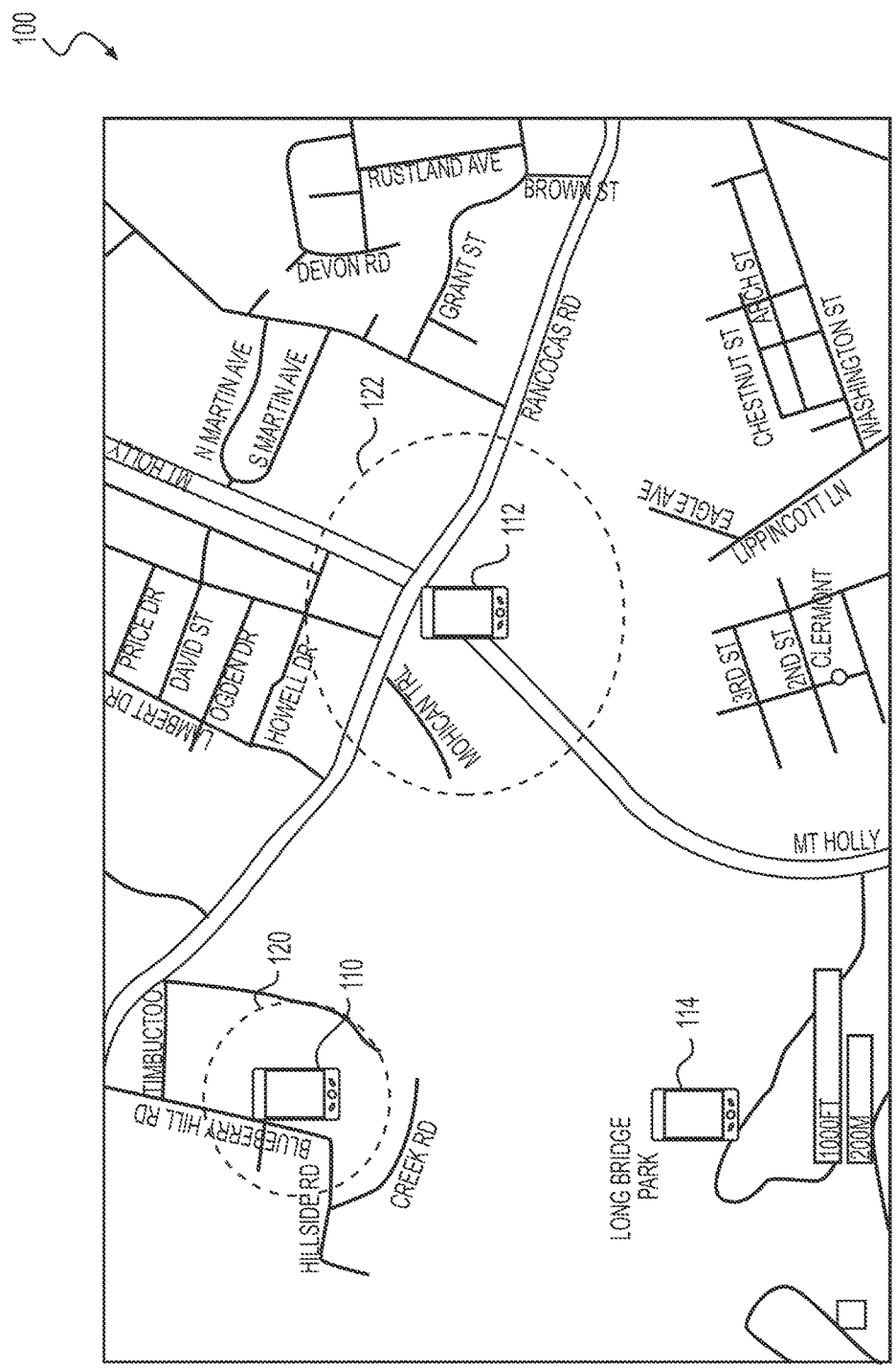
FIG. 1 illustrates exemplary predetermined geographic zones for controlling the authentication or authorization of mobile device users for accessing device, application, and/or system resources based on the geographic locations of the respective users or their mobile devices.

The present disclosure is directed to overcoming one or more of the above referenced issues. Specifically, the present disclosure is directed to systems and techniques for controlling the authentication or authorization of a mobile device user for enabling access to the resources or functionality associated with an application or service executable at the user's mobile device, which also may be generally referred to herein as "data access" with respect to an application or system accessible via a user interface at the device. In an example, the user or user's mobile device may be automatically authenticated or authorized to access application or system resources at the device when the current geographic location of the user's mobile device is determined to be within a predetermined authorization zone. Such a predetermined authorization zone may correspond to, for example, a trusted location (e.g., the user's home), which may have been previously authorized, e.g., by the user or a third-party service provider, for automatically authorizing the user for access to a particular application or resource of the mobile device.

In a different example, when the current or last known geographic location of the user's mobile device is determined to be outside the preauthorized zone, a security level or amount of authorization credentials required to authorize a user for data access may be varied according to a security level selected from among a plurality of security levels. The user's mobile device in this example may be determined to be within a geographic zone corresponding to a high security vulnerability area, e.g., the location of an event or other public area warranting increased security due to a high risk of potential attacks by hackers. The user may therefore be required to provide additional validation credentials (e.g., provide correct responses to one or more personalized security questions) before being authenticated or authorized to access a requested application or system resource at the mobile device. Accordingly, the systems and methods disclosed herein may be used to vary a security level or amount of authorization credentials required to authorize a user for data access, based on the current or last known geographic location of the user's mobile device, as will be described in further detail below.

The terms "authorization" and "authentication" are used interchangeably herein to refer to the process of validating the identity or credentials of a user or a user's mobile device in order to grant or deny the user access to the data, functionality, or other resources associated with an application or system at the mobile device. Such credentials may be associated with, for example, an account registered to the user for accessing such application or system resources via an interface provided at the user's mobile device. Examples of different validation credentials that may be used to authorize a user for access include, but are not limited to, a username and password combination for a web application or service (e.g., accessible via a web page loaded within a mobile web browser), personalized security questions, as noted above, for multi-phase authentication/authorization, and/or a passcode or personal identification number (PIN) for accessing applications and/or resources of the mobile device itself.

In an example, the application may be a web application or service hosted at a remote server, and for which an interface may be provided locally for the user at the mobile device. Alternatively, the application may be a local application executable solely at the mobile device. Such a local application may be any type of application program or code executable at the mobile device including, for example, user-level or system-level components of a mobile operating system executable at the device. Accordingly, the location based authentication or authorization features of the present disclosure may be implemented within one or more layers of a mobile operating system, e.g., for purposes of authenticating a user for allowing access to features of the mobile device itself (including applications and functions of the mobile operating system). Alternatively, such features may be implemented as components of a standalone application executable within, for example, an application layer above the operating system at the mobile device, e.g., for purposes of authenticating the user for allowing access to the functionality of the particular application.

A benefit of the present disclosure may include, but is not limited to, improving user experiences for accomplishing daily tasks that require the user or user's device to be authorized in order to access application or system resources at the user's device. Additionally, the present disclosure may be used to provide additional layers of security for accessing such resources based, at least in part, upon a current or last known physical or geographic location of the user or user's mobile device.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 illustrates exemplary predetermined geographic zones for controlling the authorization of mobile device users for accessing application or system resources based on the geographic locations of the respective users or their mobile devices. In the example shown in FIG. 1, a map 100 provides a representation of a portion of a geographic region indicating the locations of various user devices 110, 112, and 114. The locations of mobile devices 110, 112 and 114 may be based on, for example, location information derived from a Global Positioning System (GPS) coupled to the respective devices. For example, each of mobile devices 110, 112, and 114 may be any type of mobile computing device (e.g., a smartphone) equipped with a GPS receiver for registering GPS location data, e.g., latitude and longitude coordinates, at a particular point in time or over a period of time. Additionally or alternatively, the physical or geographic location of mobile devices 110, 112, or 114 may be obtained or estimated using any of various well-known techniques for deriving such geographic location information. Examples of other techniques that may be used for deriving location information include, but are not limited to, cell identification (e.g., using Cell ID), cellular tower triangulation, multilateration, Wi-Fi, or any other network or handset based technique for deriving location information for a mobile device. Further, the respective geographic locations of mobile devices 110, 112, or 114 may be obtained or estimated using GPS and/or a combination of any of the aforementioned techniques, particularly in cases where GPS data may not be available, for example, in urban canyons or other locations where line-of-sight to GPS satellites may not be feasible.

As shown in FIG. 1, the location of mobile device 110 corresponds to (e.g., falls within) a predetermined geographic zone 120 and the location of mobile device 112 corresponds to (e.g., falls within) a predetermined geographic zone 122. The predetermined geographic zones 120 and 122 may be implemented as, for example, geo-fences or virtual perimeters surrounding a predefined geographic area or region of any size and shape. The boundaries of such a geo-fence may be defined by, for example, a third-party service provider associated with a web application or service. In some implementations, such a geo-fence may be defined by the user, e.g., via a secure settings page of the web application or service that allows the user to customize user preferences for automatic login or authorization features provided by the web application or service.

In the example shown in FIG. 1, zone 120 may represent a predetermined authorization zone, which may be a predefined geographic area that has been designated as a trusted location, e.g., by the user or a third-party service provider associated with a web application or service. Accordingly, the user at mobile device 110 may be automatically authorized for access to applications or other resources at the device based in part on the physical location of the mobile device 110 being within the predetermined authorization zone 120. The predetermined authorization zone 120 may correspond to, for example, the primary residence or an area around the primary residence of the user of mobile device 110.

In an example, the user's login credentials (e.g., username and password) for accessing the functionality provided by a web application or service hosted at a web site may be stored in a local memory of mobile device 110. The user may browse to a login page of the web site via a web browser executable at mobile device 110. Mobile device 110 may be configured to automatically detect its current physical or geographic location, e.g., via a GPS or other location detecting means, and determine whether the detected location is within a predetermined authorization zone (e.g., zone 120).

Alternatively, the determination may be performed by a remote server at which the web application or service may be hosted. Thus, in a different example, mobile device 110 may be configured to send a request for data access including the user's login credentials and current geographic location via a communication network to a remote application server, and the application server may attempt to authorize the user based on the information included in the request received from the mobile device. If the application server determines that the mobile device is currently located within the predetermined authorization zone 120 in this example, the server may attempt to validate the user's login credentials, as received in the request, and once validated, automatically authorize the user of the mobile device for access to the functionality of the web application using the login credentials.

As noted above, the location of mobile device 112 corresponds to (e.g., falls within) a predetermined geographic zone 122. In the example shown in FIG. 1, zone 122 may represent a predetermined restriction zone, in which access to the functionality of the application or resource at mobile device 112 is restricted for the user while mobile device 112 is determined to be located within the predetermined restriction zone 122. Thus, the user may be precluded from successfully logging-in or accessing the functionality of a web application or service while mobile device 112 is located within the predetermined restriction zone 122 and until the geographic location of mobile device 112 is no longer determined to be within the boundaries of zone 122. As described above, this determination may be performed by the web application or service (hosted at a remote server) based on location information captured (e.g., by a GPS device coupled to mobile device 112) and sent by mobile device 112 via a communication network or alternatively, by mobile device 112 itself (e.g., by an application or system service executable at mobile device 112).

Also, as shown in the example of FIG. 1, the location of mobile device 114 may correspond to neither the predetermined authorization zone 120 nor the predetermined restriction zone 122. In this example, the application or service, e.g., which may be executable at mobile device 114 or at a remote server hosting an associated application or service, may be configured to determine a security level associated with the current geographic location of mobile device 114. The current geographic location of mobile device 114 may correspond to another type of predetermined restriction zone, which may require a relatively higher security level than the authorization zone 120, though relatively lower than that of restriction zone 122. Such a second type of predetermined restriction zone may correspond to, for example, a zone that represents the remaining geographic area shown in map 100 after excluding the areas covered by zones 120 and 122. Thus, this second type of restriction zone may be considered a default geographic zone having a default security level for authorization purposes. Alternatively, this second type of restriction zone may be associated with an area requiring a heightened security level, while not completely restricting access. For example, such a heightened security level may require a multi-phase authorization scheme for authorizing the user or user's mobile device 114. Such a multi-phase authorization scheme may involve requiring the user to correctly answer one or more personalized security questions in addition to providing valid login credentials.

While geographic zones 120 and 122 are described in the above example as corresponding to predetermined authorization and restriction zones, respectively, it should be noted that these designations are used for explanatory purposes only and that the present disclosure is not intended to be limited thereto. For example, each of geographic zones 120 and 122 may be associated with any one of a plurality of security levels, where each successive security level within the plurality may correspond to an area with a heightened risk of security vulnerability, and therefore, requires a greater degree or amount of user credentials or information to be provided in order for the user to be authorized for access to a requested resource or application at the user's mobile device. Thus, in the example described with respect to FIG. 1, the security level associated with the predetermined restriction zone 122, where authorization of the user for the requested data access is restricted, may correspond to an area where the potential security risk may be at the highest level. However, the security level associated with the predetermined authorization zone 120, where the user is automatically authorized, may correspond to an area designated as a trusted location that poses the lowest risk or threat of a security breach (e.g., the user's home).

Figure 2:
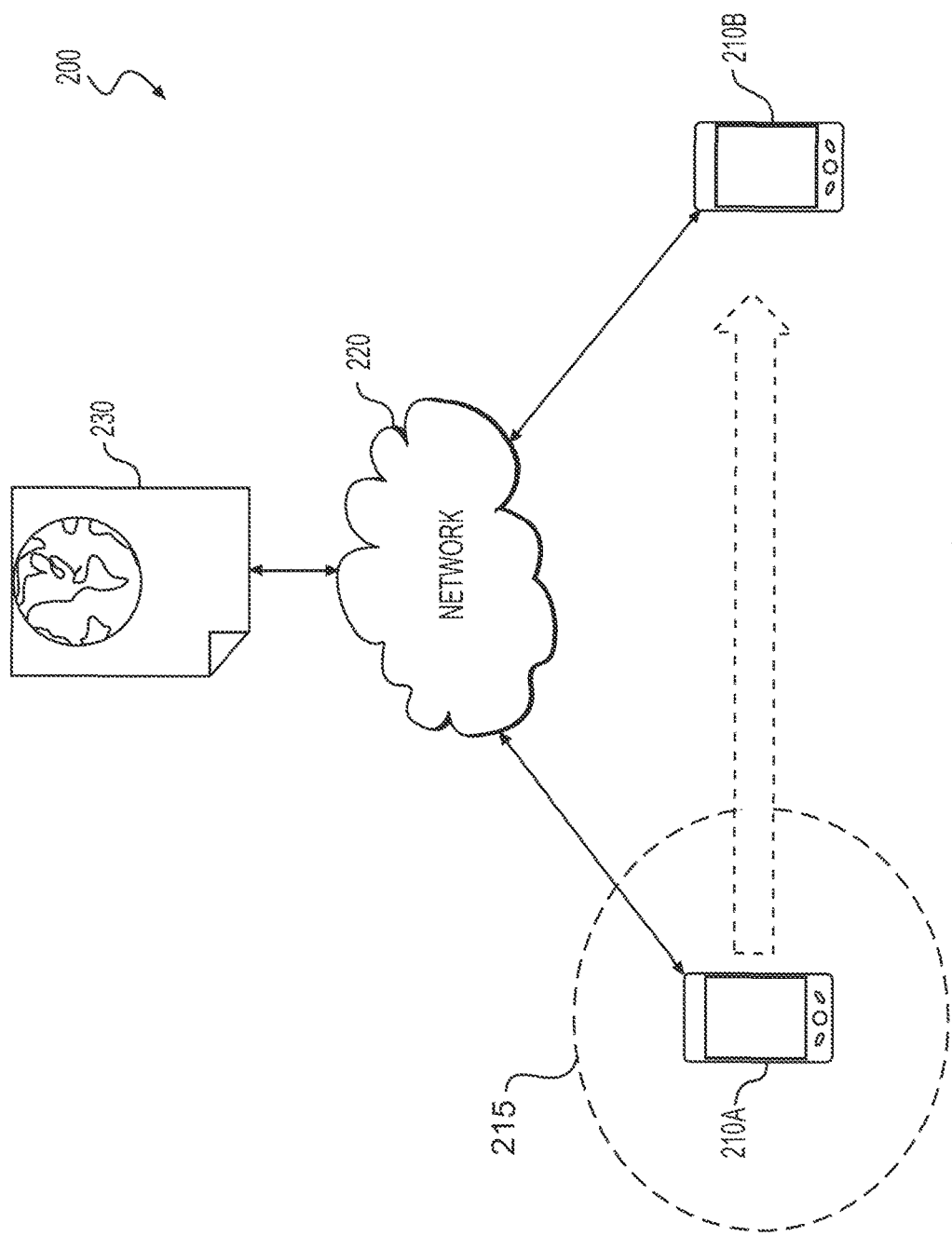
FIG. 2 illustrates an exemplary system for controlling the authorization of a mobile device user for accessing resources of a device, web application, and/or service based on the geographic location of the user's mobile device.

FIG. 2 illustrates an exemplary system 200 for controlling the authorization of a mobile device user for accessing resources of a web application or service based on the geographic location of the user's mobile device. In the example shown in FIG. 2, the web application or service may be accessible through a web site 230 loaded within a web browser executable at a mobile device 210A or 210B of a user. In this example, mobile device 210A and 210B represent the same mobile device in different physical or geographic locations. Thus, mobile device 210A may represent the user's mobile device located within a predetermined authorization zone 215, while mobile device 210B is the same mobile device after having been moved to a location outside the predetermined authorization zone 215.

As described above, predetermined authorization zone 215 may be a geographic area of any size or shape that is encompassed by a virtual perimeter or boundary, e.g., as defined by a geo-fence. Such a geo-fence may be dynamically generated around, for example, a current geographic location of mobile device 210A or other predetermined location point. Alternatively, such a geo-fence may be implemented as a predefined set of boundaries, which may be based on an existing geographic zone (e.g., existing school or neighborhood zone) or a customized geographic zone, e.g., as specified by the user or a third-party service provider.

The web site 230 and associated web application may be hosted at a remote server (not shown), which is communicatively coupled with mobile device 210A/210B via a network 220. Network 220 may be any type of electronic network or combination of networks used for communicating digital content and data between various computing devices. Network 220 may be, for example, a local area network, a medium area network, or a wide area network, such as the Internet. Mobile device 210A/210B may be a smartphone, a personal digital assistant ("PDA"), a tablet computer, or any other type of mobile computing device. Such a mobile computing device may have, for example, a touchscreen display for receiving input from a user at the device and displaying various types of content as output to the user. Mobile device 210A/210B may also be equipped with a GPS for obtaining and reporting location information, e.g., GPS coordinate, via network 220 to and from the server hosting web site 230.

In an example, the user at mobile device 210A may browse to a login page of web site 230 via a web browser interface executable at mobile device 210A. The login page may provide a form including one or more control fields for the user to enter login credentials (e.g., a username and password) for accessing the resources or functionality provided by the web site 230. Such login credentials may have been previously stored in a local memory of mobile device 210A, e.g., during a prior session after the user had entered the login credentials and was successfully authorized for access by web site 230.

In some implementations, mobile device 210A may be configured to automatically send the stored login credentials to web site 230 via network 220, without any intervention from the user, upon determining that its current physical location is within predetermined authorization zone 215. Accordingly, when the user browses to web site 230, e.g., by entering a universal resource locator (URL) address in an address field of a web browser executable at mobile device 210A, web site 230 may automatically authorize the user for access to the functionality of web site 230 (e.g., by logging the user into web site 230) based on the login credentials received from mobile device 210A, without the user having to manually enter the login credentials, e.g., via the login page, as described above.

However, the user may be required to manually submit the login credentials again for authorization and access to web site 230, when the physical location of the mobile device 210A transitions to an area outside predetermined authorization zone 215, e.g., corresponding to mobile device 210B, as shown in FIG. 2. Thus, mobile device 210B may detect that it is outside of the predetermined authorization zone 215, and as a result, not perform any automatic authorization functions (e.g., sending stored login credentials to web site 230) or otherwise interfere with the default authorization process (e.g., via the login page) of web site 230.

While the above-described example, as shown in FIG. 2, refers to only predetermined authorization zone 215, it should be noted that the present disclosure is not intended to be limited thereto and that any number of predetermined authorization zones, e.g., preauthorized geo-fenced areas, may be used as desired. Further, it should be noted that other predetermined geographic zones with varying security levels and corresponding authorization requirements also may be used, e.g., different types of restriction zones requiring various levels or phases of authorization, as described above with respect to the exemplary geographic zones of FIG. 1.

Figure 3:
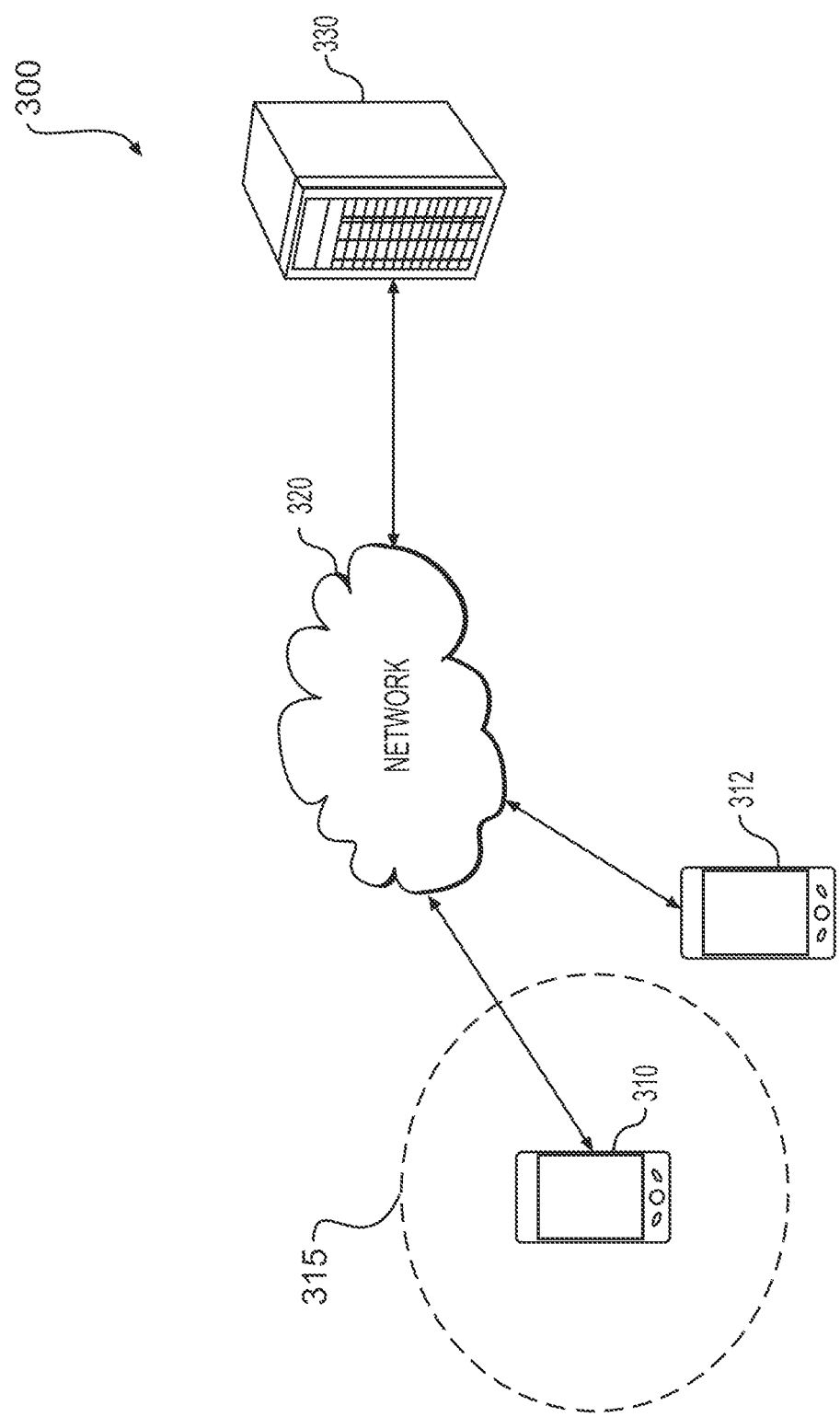
FIG. 3 is a diagram of an exemplary client-server system for controlling the authorization of a mobile device user for accessing resources of a device, web application, and/or service based on the geographic location of the user's mobile device.

FIG. 3 is a diagram of an exemplary client-server system 300 for controlling authorization of a mobile device user for accessing resources of a web application or service based on the geographic location of the user's mobile device. As shown in FIG. 3, system 300 includes a mobile device 310 located within a predetermined authorization zone 315, a mobile device 312, a network 320, and a server 330. Also, as shown in FIG. 3, each of mobile device 310 and 312 may be communicatively coupled to server 330 via network 320. Like network 220 of FIG. 2, described above, network 320 may be any type of electronic network or combination of networks used for communicating digital content and data between various computing devices. For purposes of explanation, system 300 will be described using system 200 of FIG. 2, as described above, but system 300 is not intended to be limited thereto. While only mobile devices 310 and 312 are shown in FIG. 3, system 300 may include additional mobile devices or other types of computing devices. Likewise, while only server 330 is shown in FIG. 3, system 300 may include additional servers depending as may be desired for a particular implementation.

In an example, server 330 may be used to host a web application or service, and the functionality of the web application or service may be accessible via an interface provided within a client application executable at each of mobile devices 310 and 312. Such a client application may be, for example, any type of mobile application executable at each of mobile devices 310 and 312, e.g., either as a standalone application or within a third-party application, such as a mobile web browser executable at each device. The web application or service in this example may be similar to that described above with respect to web site 230 of FIG. 2. Thus, the default authorization procedure for the web application or service to provide access to application data and/or functionality may include, for example, requiring a mobile device user to manually enter login credentials via a form displayed on a login page loaded within a web browser executable at the user's mobile device. As will be described in further detail below, a user may circumvent the default authorization procedure of the web application or associated web site by being located within predetermined authorization zone 315. However, it should be noted that the web application or site that is hosted at server 330 may still require valid login credentials for the user to be stored within a data store (e.g., either within a memory at the user's mobile device or local data store) that is accessible to server 330.

In an example, server 330 may be configured to request a current geographic location of mobile device 310 or mobile device 312 via network 320 in response to receiving a request for data access from either device. In some implementations, mobile devices 310 and 312 (or a client application executable at each device) may be configured to include location information relating to the current geographic location of the respective mobile device within the initial data access request sent to server 330. Such location information may be captured at each of mobile devices 310 and 312 using a GPS of the device or any of various other well-known location detecting techniques, as described above. Accordingly, server 330 may be configured to first check the initial request for location information corresponding to the mobile device and send a request for the device's current geographic location only if the location information is not included in the initial request received from the device.

Upon receiving a response including the requested current geographic location of the mobile device, server 330 may determine whether the current geographic location of the mobile device is within a predetermined authorization zone, e.g., predetermined authorization 315. In the example shown in FIG. 3, if the initial request was received at server 330 from mobile device 310, server 330 may determine that the current geographic location of mobile device 310 is within predetermined authorization zone 315 and therefore, automatically authorize the user of mobile device 310 for data access in accordance with the request received from the device. However, if the request came from mobile device 312 instead, server 330 may determine that the current geographic location of mobile device 312 is not within any predetermined authorization zone and require the user to manually enter valid login credentials, e.g., similar to the default authorization procedure.

In some implementations, upon determining that the location of mobile device 312 is not within any predetermined authorization zone, server 330 may be configured to determine a security level for the user based on the current geographic location of mobile device 312. The appropriate security level may represent, for example, the level of risk for a potential security breach associated with the particular geographic location of mobile device 312. This may be based on, for example, a prior security assessment or statistical data indicating the degree to which the user or user's mobile device may be vulnerable to security breaches or information theft. For example, there may be evidence indicating that the particular area in which the user is determined to be located is prone to cyber-attacks by hackers.

Additionally or alternatively, the level of risk and corresponding security level may be based on the particular user's location history, e.g., as stored in a data store coupled to server 330 and associated with registered account information for the user. In an example, server 330 may estimate a security risk level based on the current geographic location of the user or user's mobile device and the location history of known locations at which the user has been known to be during a predetermined time period (e.g., within the last month or week). If server 330 determines that the current geographic location of the user in this example is unfamiliar or unusual given the user's recent location history, e.g., the current geographic location of the device is determined to be in an unusual geographic region for the user or one that is relatively far away from the locations that the user has been known to have visited previously.

Once server 330 determines the appropriate security level based on the current geographic location of the user's mobile device (e.g., mobile device 312), server 330 may request authorization information for manual authorization of the user based on the determined security level. In an example, the level or degree of authorization required or amount of information that the user must provide in order to be authorized for accessing application data or functionality as requested may vary according to the security level. Further, the security level may be one of a plurality of security levels, and the authorization information requested for manual authorization of the user may vary between each of the plurality of security levels.

In an example, at least one of the security levels may correspond to a predetermined restriction zone (e.g., restriction zone 122 of FIG. 1, as described above), in which data access for the user is restricted when the current geographic location of the user's mobile device is determined to be within the predetermined restriction zone. In another example, the security level for the current geographic location may require multi-phase authorization involving multiple phases or levels of authorization and appropriate credentials to be validated at each level in order for the user to be properly authorized for access. Such multi-phase authorization may include, for example, requiring the user to provide a valid username and password combination in addition to the correct answers to one or more security questions. Such security questions may be, for example, personalized questions for the user, e.g., based on answers previously provided by the user for selected security challenge questions. Examples of such challenge questions include, but are not limited to: "what is your mother's maiden name?;" "what is the name of your second grade teacher?"; "in which city was your father born?"; etc. Upon receiving the requested authorization information from the user's mobile device (e.g., mobile device 312) via network 320, server 330 in this example may authorize the user for data access based on the received authorization information and in accordance with the initially received request.

Figure 4:
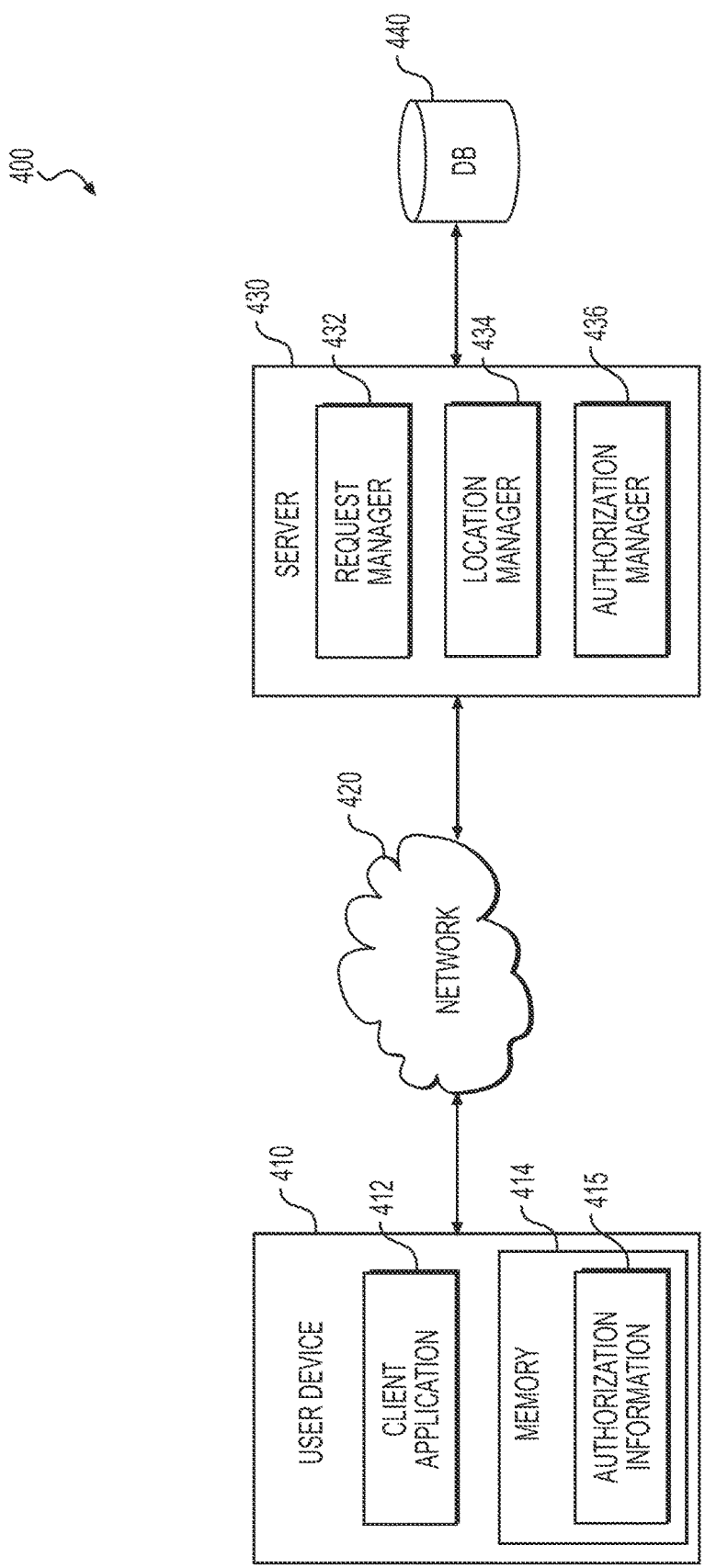
FIG. 4 is a block diagram of an exemplary client-server system suitable for practicing an embodiment of the present disclosure.

FIG. 4 is a block diagram of an exemplary client-server system 400 suitable for practicing an embodiment of the present disclosure. For purposes of discussion, system 400 will be described using map 100 of FIG. 1, system 200 of FIG. 2, and system 300 of FIG. 3, as described above, but system 400 is not intended to be limited thereto. In an example, user device 410 may be used to implement any of mobile devices 110, 112, and 114 of FIG. 1, mobile device 210A/210B of FIG. 2, and/or mobile devices 310 and 312 of FIG. 3, as described above. Also, server 430 may be used to implement server 330 of FIG. 3, as described above.

As shown in FIG. 4, system 400 includes a user device 410, a network 420, a server 430, and a database 440. User device 410 executes a client application 412 and includes a memory 414 for storing authorization information 415 and any other data or instructions for use by user device 410, client application 412, or other application executable at user device 410. Server 430 includes a request manager 432, a location manager 434, and an authorization manager 436. Database 440 may be any type of data store or recording medium for storing data accessible to server 430. Such data may include, for example and without limitation, data associated with an account or profile registered for a user of a web application or service hosted at server 430. Accordingly, account or profile data for the user may include login credentials (e.g., username and password) for authorizing the user for access to the data or functionality of the web service or application. In an example, the user may be a user of user device 410 and the functionality of the web application may be accessible to the user via an application interface executable at user device 410.

In the example shown in FIG. 1, user device 410 may be a smartphone, a personal digital assistant ("PDA"), a tablet computer, or other type of mobile computing device. Examples of such mobile computing devices include, but are not limited to, a laptop computer, a handheld computer, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen display, microphone, camera, keyboard, and/or mouse. User device 410 may also be equipped with or coupled to a GPS for capturing location information, e.g., latitude and longitude coordinates or other GPS data, used for determining or estimating a current geographic location of mobile device 410 at a particular point in time or over a period of time. As will be described in further detail below, mobile device 410 may also communicate the captured location information or determined current geographic location to server 430 via network 420 for purposes of enabling the location based authorization techniques disclosed herein.

Network 420 may be any type of electronic network or combination of networks used for communicating digital content and data between various computing devices. Network 420 may be, for example, a local area network, a medium area network, or a wide area network, such as the Internet. While only user device 410 is shown in FIG. 4, system 400 may include any number of user devices. Also, while only server 430 is shown in FIG. 4, it should be understood that system 400 may include additional servers as desired for a particular implementation. Further, while not shown in FIG. 4, network 420 or system 400 may include any number of intermediate routers, gateways, or other network devices for facilitating communications between various computing devices over network 420.

It should be noted that any of various techniques may be used to derive geographic location information for user device 410, including during times when GPS signal reception may not be available, for example, in urban canyons or other locations where line-of-sight to GPS satellites may not be feasible. Examples of other techniques that may be used for deriving location information for user device 410 include, but are not limited to, cell identification (e.g., using Cell ID), cellular tower triangulation, multilateration, Wi-Fi, or any other network or handset based technique for deriving location information for a mobile device. User device 410 may also communicate with other computing devices by any suitable means including, but not limited to, wireless communication via Wi-Fi, radio frequency (RF), infrared (IR), Bluetooth, Near Field Communication, or any other suitable means for communicating different types of information between various computing devices.

Servers 430 may be implemented using any of various types of servers including, but not limited to a web server, an application server, a proxy server, a network server, or a server farm. Further, server 430 may be implemented using, for example, any type of general-purpose computer capable of serving data to other computing devices including, but not limited to, user device 410 or any other computing device (not shown) via network 420. Such a general-purpose computer can include, but is not limited to, a computing device having at least one processor and memory for executing and storing instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory and graphical user interface display. While only server 430 is shown in FIG. 4, it should be noted that the functions performed by server 430 may be implemented using multiple computing devices, each having one or more processors and one or more shared or separate memory components. Such multiple computing devices may be configured to function together within, for example, a clustered computing environment or server farm.

In an example, request manager 432 of server 430 is configured to receive a request for data access from user device 410 via network 420. The request may have been initiated based on input received from the user via, for example, a graphical user interface (GUI) of client application 412. In some implementations, the client application 412 may be configured to determine whether a current geographic location of user device 410 is within a predetermined authorization zone (e.g., predetermined authorization zone 315 of FIG. 3, as described above), and automatically provide server 430 with login credentials for accessing the functionality of a web application or service hosted at server 430, when user device 410 is determined to be located within the predetermined authorization zone. The login credentials may be stored as, for example, authorization information 415 within memory 414 of user device 410. Further, the login credentials may have been stored previously at user device 410 during a prior successful login by the user and session of use of the web application. In an example, when the current geographic location of user device 410 is determined to be within a predetermined authorization zone, client application 412 may automatically retrieve the login credentials or other authorization information 415 from memory 414 and include it with the request for data access sent to server 430 (and received by request manager 432) via network 420.

In some implementations, request manager 432 may be configured to request the current geographic location of user device 410 in response to receiving the initial request for data access from user device 410 via network 420. Upon receiving a response from user device 410 including the requested current geographic location of the device, location manager 434 may determine whether the current geographic location of user device 410 is within a predetermined authorization zone. As described above, the predetermined authorization zone may be implemented as, for example, a geo-fence surrounding a trusted geographic location associated with the user of device 410 (e.g., a geo-fence corresponding to the user's home or residence).

In an example, the request from user device 410 (or client application 412) may include a device identifier in addition to location information for determining or estimating the current (or last known) geographic location of user device 410. The device identifier may be, for example, a unique identifier that was previously assigned to user device 410 (e.g., by the web application hosted at server 430). Request manager 432 in this example may extract the device identifier from the data access request from user device 410. Request manager 432 may use the device identifier to identify user device 410 and send a request to user device 410 via network 420 for the current geographic location of user device 410 (or location information used for determining such location). Request manager 432 may then pass the device identifier and any location information received from user device 410 to location manager 434. Location manager 434 may use the device identifier to identify and retrieve authorization information associated with user device 410, for example, which may be stored in database 440. The retrieved authorization information may include, for example and without limitation, user login credentials associated with a registered account for the user and used for validating the credentials received from user device 410. The retrieved authorization information may also include information related to a predetermined authorization zone, e.g., a geographic area or region that has been previously authorized by the user and/or web application for automatically authorizing the user or user device 410 (and client application 412) for access to the resources or functionality of the web application.

In an example, authorization manager 436 may automatically authorize the user of user device 410 for data access in accordance with the received request, when the current or last known geographic location of user device 410 is determined by location manager 434 to be within the predetermined authorization zone associated with the device identifier of user device 410 (e.g., and registered user account).

In another example, when the current geographic location of user device 410 is determined not to be within the predetermined authorization zone for the device, authorization manager 436 may be configured to determine a security level for the user based on the current geographic location of user device 410, as described previously. Authorization manager 436 may then request authorization information for manually authorizing the user for access based on the determined security level. Upon receiving the requested authorization information from user device 410 via network 420, authorization manager 436 may authorize the user for access in accordance with the initial request for data access based on the received authorization information. The requested authorization information may include, for example, login credentials in the form of a username and password along with answers to one or more security challenge questions.

In some implementations, the user may be authorized for access only during a limited or predetermined time period, and user device 410 or client application 412 may be configured to periodically request authorization, e.g., in order to maintain the user's access to application resources and functionality. Thus, in response to receiving a subsequent request for data access from user device 410 following authorization of the user for data access in accordance with the first request, location manager 434 may request an updated current geographic location of user device 410 via network 420. Such a subsequent request may be sent by user device 410, for example, after user device 410 is powered on or reactivated after being placed in a sleep or off state.

Upon receiving the updated current geographic location of user device 410 as requested, location manager 434 may determine whether the updated current geographic location is still within a predetermined authorization zone, e.g., the same predetermined authorization zone or different predetermined zone that also has been previously authorized as a trusted geographic area for accessing application resources and functionality. When the updated current geographic location of user device 410 is determined not to be within a predetermined authorization zone, authorization manager 436 may revoke the user's authorization for data access. Authorization manager 436 may further request authorization information for manual authorization of the user for data access, e.g., based on a security level determined for the particular geographic location.

As described above, location manager 434 may use the device identifier associated with user device 410 to retrieve authorization information associated with the device and an account registered for the user, as may be stored in, for example, database 440. In an example, the retrieved authorization information may include authorization credentials associated with the user, e.g., a username and password for logging the user into the web application for data access, and a timestamp associated with a prior successful authorization of the user using the authorization credentials. Further, authorization manager 436 may be configured to determine whether the predetermined authorization zone is currently valid for purposes of automatically authorizing the user based on the authorization information retrieved for the user and user device 410. This may include, for example, determining whether the prior successful authorization of the user occurred within a predetermined time period based on the timestamp.

While the examples above are described in the context of server 430, it should be noted that request manager 432, location manager 434, and authorization manager 436, along with their corresponding functions, may be implemented at user device 410, e.g., as components of client application 412.

Figure 5:
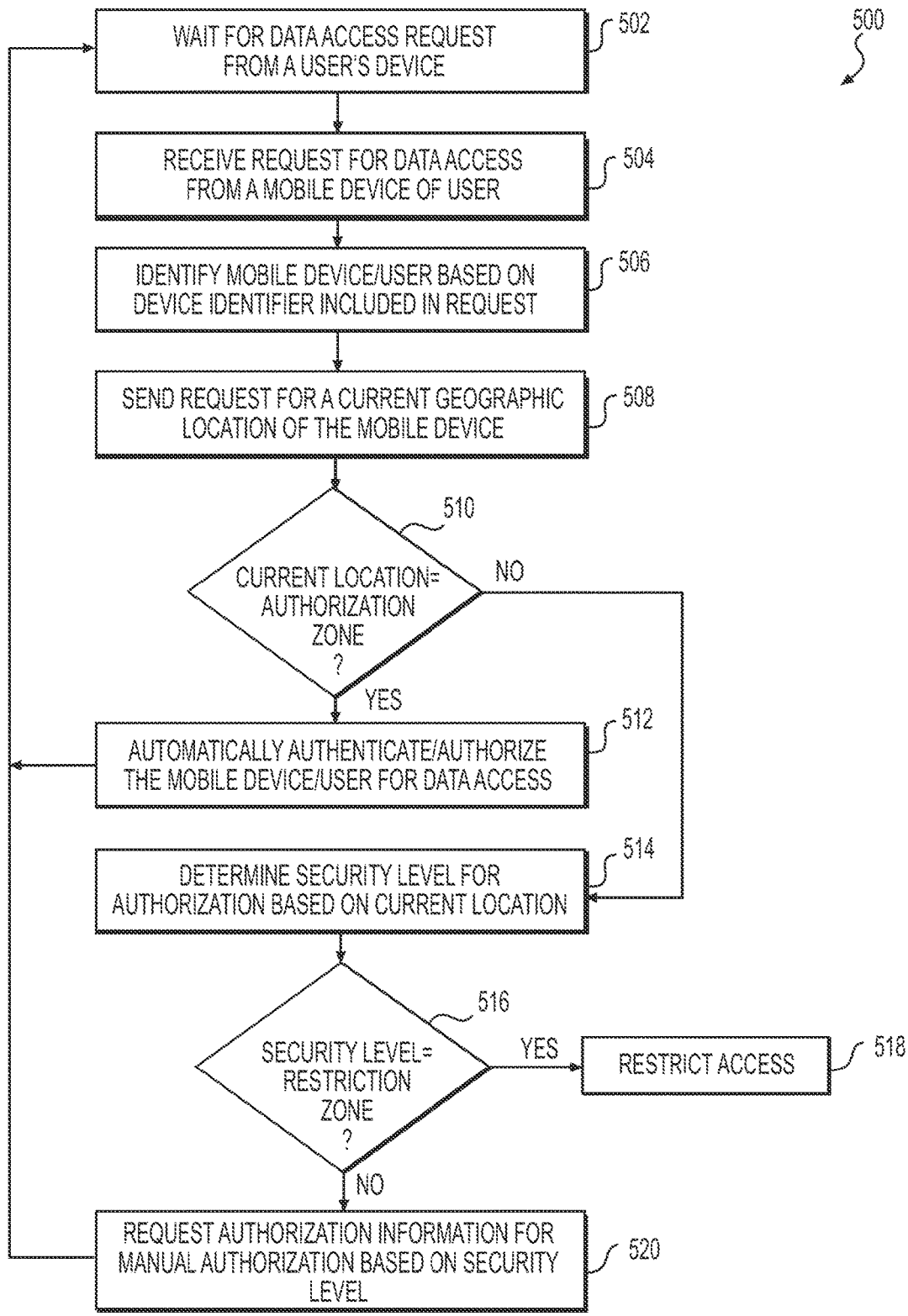
FIG. 5 is a process flowchart of an exemplary method for controlling the authorization of a mobile device user for accessing application or system resources based on the geographic location of the user's mobile device.

FIG. 5 is a process flowchart of an exemplary method 500 for controlling authorization of a mobile device user for accessing application or system resources based on the geographic location of the user's mobile device. For purposes of discussion, method 500 will be described using system 400 of FIG. 4, but method 500 is not intended to be limited thereto. As shown in FIG. 5, method 500 includes steps 502, 504, 506, 508, 510, 512, 514, 516, 518, and 520. However, it should be noted that method 500 may include more or fewer steps as desired for a particular implementation. In an example, one or more of the above-listed steps of method 500 may be executed by request manager 432, location manager 434, or authorization manager 436 of server 430 of FIG. 4, as described above. However, method 500 is not intended to be limited thereto, and the steps of method 500 may be performed by any server or other type of computing device having at least one processor, a memory, and a network communication interface for sending and receiving information from one or more user devices.

Method 500 begins in step 502, which includes waiting for a data access request from a user's device. In step 504, a request for data access may be received from a user's mobile device (e.g., user device 410 of FIG. 4, as described above). The request for data access may include, for example, a device identifier associated with the user's mobile device. In step 506, the mobile device and/or the user may be identified based on the device identifier included in the request received in step 504. Steps 502, 504, and 506 may be performed by, for example, request manager 432 of FIG. 4, as described above.

Method 500 then proceeds to step 508, in which a request for a current geographic location of the mobile device is sent via, for example, a communication network (e.g., network 420 of FIG. 4, as described above). Upon receiving a current or last known geographic location of the mobile device, as requested, method 500 proceeds to step 510, which includes determining whether the current geographic location of the mobile device is within a predetermined authorization zone, as previously described. Steps 508 and 510 may be performed by, for example, location manager 434 of FIG. 4, as described above.

If the current geographic location of the mobile device is determined to be within the predetermined authorization zone, method 500 proceeds to step 512, in which the user or user's mobile device is automatically authorized for data access, e.g., access to the resources or functionality of a web application or service via a client application (e.g., client application 412 of FIG. 4, as described above) or other interface executable at the user's mobile device. Step 512 may be performed by, for example, authorization manager 436 of FIG. 4, as described above. After step 512, method 500 may return to step 502, which includes waiting for additional data access requests from the user's device. Otherwise, method 500 proceeds to steps 514, 516, 518, and 520, as will be described in detail below.

In step 514, once it has been determined that the current geographic location of the mobile device is not within the predetermined authorization zone, a security level for authorizing the user for access may be determined based on the current geographic location of the user's mobile device. The security level determined for the user may be, for example, one of a plurality of security levels, where each level requires a different amount or level of authorization credentials for authorizing the user for data access. In some implementations, the plurality of security levels may correspond to varying levels of accessibility, e.g., by limiting the user's accessibility to application resources or functionality to varying degrees. At least one of the security levels may correspond to, for example, a predetermined restriction zone, which may be a predetermined (e.g., geo-fenced) geographic area or region in which authorization may not be possible or the user's prior authorization may be revoked and all data access (e.g., access to application resources or functionality) is restricted. Similarly, other security levels may correspond to different geographic regions requiring various levels of authorization credentials or accessibility, without limiting access altogether as in the predetermined restriction zone.

Thus, if the security level is determined to correspond to a restriction zone in step 516, method 500 may proceed to step 518, in which access to application resources and functionality is restricted. However, if the security level is determined not to correspond to a restriction zone in step 516, method 500 may proceed to step 520, which includes requesting authorization information for manually authorizing the user based on the determined security level. Such authorization information may be requested from the user via, for example, a web page loaded within a web browser or GUI of a client application executable at the user's mobile device. Upon receiving the requested authorization information from the mobile device, step 520 may include authorizing the user of the mobile device for data access based on the received authorization information and in accordance with the initial request received in step 504. After step 520, method 500 may also return to step 502, which includes waiting for additional data access requests from the user's device. Steps 514, 516, 518, and 520 may be performed by, for example, authorization manager 436 of FIG. 4, as described above.

Figure 6:
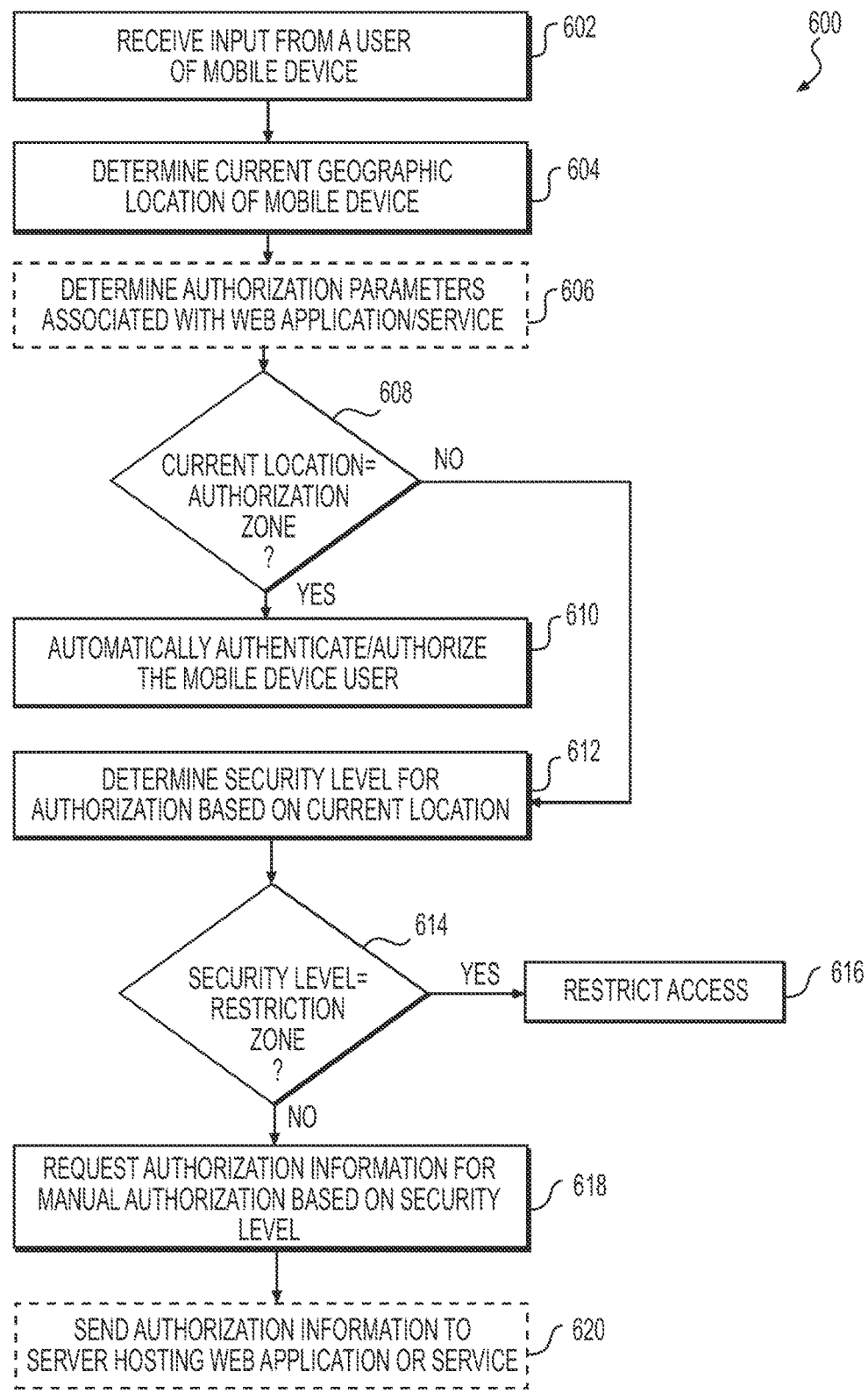
FIG. 6 is a process flowchart of another exemplary method for controlling the authorization of a mobile device user for accessing application or system resources based on the geographic location of the user's mobile device.

FIG. 6 is a process flowchart of another exemplary method 600 for controlling a level of authorization of a mobile device user for accessing application or system resources based on the geographic location of the user's mobile device. For purposes of discussion, method 600 will be described using system 400 of FIG. 4, as described above, but method 600 is not intended to be limited thereto. As shown in FIG. 6, method 600 includes steps 602, 604, 606, 608, 610, 612, 614, 616, 618, and 620, where steps 606 and 620 are optional steps, as will be described in further detail below. However, it should be noted that method 600 may include more or fewer steps as desired for a particular implementation. In an example, one or more of the above-listed steps of method 600 may be executed by client application 412 of user device 410 of FIG. 4, as described above. However, method 600 is not intended to be limited thereto, and the steps of method 600 may be performed by any type of computing device having at least one processor, a memory, and a means for determining or estimating a current or last known geographic location of the device.

Such a location determining means of the device may include, but is not limited to, a GPS, WiFi, and/or cell-ID. In an example, the user's mobile device or client application executable at the device may be configured to use the best available location determining means at the particular time.

Method 600 begins in step 602, which includes receiving input from a user of a mobile device. For example, the input received from the user in step 602 may be for purposes of logging into a web site or application associated with the web site, which may be hosted at a remote server (e.g., server 430 of FIG. 4, as described above). In a different example, the input from the user may be a password or security code for purposes of authorizing the user for access to applications, resources, and functionality of the mobile device itself.

Method 600 then proceeds to step 604, in which the current geographic location of the mobile device is determined or estimated based on location information captured at the device by a GPS or other location determining means available to the mobile device, as described previously. In some implementations, method 600 may proceed to step 606, which includes determining authorization parameters associated with a particular web application or service to which the user is attempting to gain access. In an example, different web applications may have different authorization requirements, for which corresponding parameters may be predefined. Examples of such authorization parameters include, but are not limited to, a day-of-week parameter (e.g., for allowing user access only on particular days of the week), a time-of-day parameter (e.g., for allowing user access only during particular time periods), and a session counter parameter (e.g., for allowing user access for only a predetermined number of times).

Upon determining or estimating the current geographic location of the mobile device, method 600 proceeds to step 608, which includes determining whether the current geographic location of the mobile device is within a predetermined authorization zone, as previously described. If the current geographic location of the mobile device is determined to be within the predetermined authorization zone, method 600 proceeds to step 610, in which the user or user's mobile device is automatically authorized for data access, e.g., access to the resources or functionality of the mobile device or an application (e.g., client application 412 of FIG. 4, as described above) executable at the device. In an example, step 610 may include automatically sending authorization credentials to a server (e.g., server 430 of FIG. 4, as described above) hosting a web application via a network (e.g., network 420 of FIG. 4, as described above), and the web application may automatically log the user into the web application/service or associated web site for purposes of enabling the user to access application resources and functionality. The login credentials sent to the server in this example may have been previously validated by the web application and stored in a memory of the user device (e.g., memory 414 of user device 410 of FIG. 4, as described above).

However, if the current geographic location of the mobile device is determined not to be within a predetermined authorization zone, method 600 proceeds to steps 612, 614, 616, 618, and 620. In step 612, once it has been determined that the current geographic location of the mobile device is not within a predetermined authorization zone, a security level for authorizing the user for access may be determined based on the current geographic location of the user's mobile device. As described above, the security level determined for the user may be, for example, one of a plurality of security levels, where each level requires a different amount or level of authorization credentials for authorizing the user for data access. In some implementations, the plurality of security levels may correspond to varying levels of accessibility, e.g., by limiting the user's accessibility to application resources or functionality to varying degrees. At least one of the security levels may correspond to, for example, a predetermined restriction zone, which may be a predetermined (e.g., geo-fenced) geographic area or region in which authorization may not be possible or the user's prior authorization may be revoked and all data access (e.g., access to application resources or functionality) is restricted. Similarly, other security levels may correspond to different geographic regions requiring various levels of authorization credentials or accessibility, without limiting access altogether as in the predetermined restriction zone.

Thus, if the security level is determined to correspond to a restriction zone in step 614, method 600 may proceed to step 616, in which access to application or device resources and functionality is restricted. However, if the security level is determined not to correspond to a restriction zone in step 614, method 600 may proceed to step 618, which includes requesting authorization information for manually authorizing the user based on the determined security level. Such authorization information may be requested from the user via, for example, a web page loaded within a web browser or GUI of a client application executable at the user's mobile device. In some implementations, upon receiving the requested authorization information from the user (e.g., based on user input received via the GUI of the client application), method 600 may proceed to step 620, which includes sending the authorization information to a web server (e.g., server 430 of FIG. 4, as described above) hosting the web application or service for which the user is attempting to access.

Figure 7:
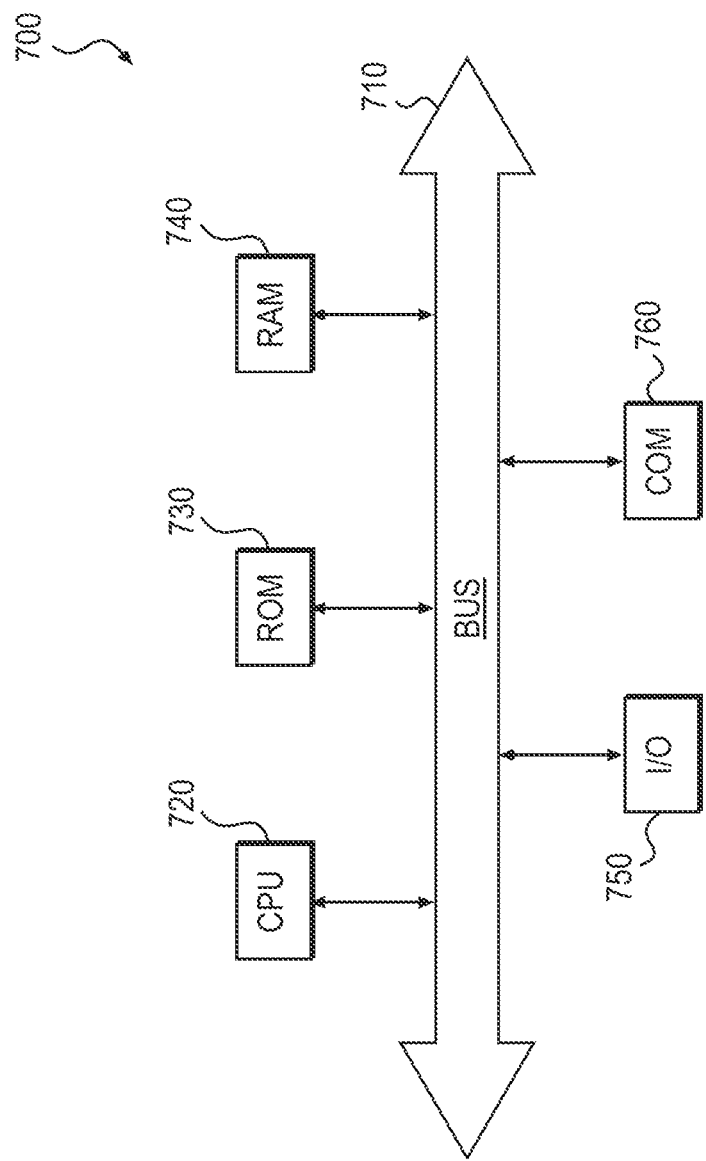
FIG. 7 is a block diagram of an exemplary computer system in which embodiments of the present disclosure may be implemented.

FIG. 7 is a block diagram of an exemplary computing system 700 in which embodiments of the present disclosure may be implemented. Computing system 700 may be used to implement portions of, for example: mobile devices 110, 112, and 114 of FIG. 1; mobile device 210A/210B of FIG. 2; mobile devices 310, 312 and server 330 of FIG. 3; and user device 410 and server 430 of FIG. 4, as described above. Further, computing system 700 may be configured to store and execute instructions to: (i) implement one or more components of systems 300 and 400 of FIGS. 3 and 4, respectively; (ii) perform the steps of exemplary method 500 of FIG. 5; and/or (iii) perform the steps of exemplary method 600 of FIG. 6.

In one embodiment, computing system 700 may include a data communication interface for packet data communication 760. The platform may also include a central processing unit (CPU) 720, in the form of one or more processors, for executing program instructions. The platform typically includes an internal communication bus 710, program storage and data storage for various data files to be processed and/or communicated by the platform such as ROM 730 and RAM 740, although computing system 700 often receives programming and data via a communications network (not shown). The hardware elements, operating systems and programming languages of such equipment are conventional in nature, and it is presumed that those skilled in the art are adequately familiar therewith. Computing system 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

While some embodiments of the disclosed methods, devices, and systems are described with exemplary reference to applications for mobile devices, it should be appreciated that the presently disclosed embodiments may be applicable to any environment, such as a desktop or laptop computer, an automobile entertainment system, a home entertainment system, etc. Also, as previously noted, the presently disclosed embodiments may be applicable to any type of content, such as text content or video content.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for controlling authorization of mobile device users based on geographic location on a network, the method comprising:
   responsive to receiving a request for a first data access session from a first mobile device, requesting a current geographic location of the first mobile device;
   upon receiving a response including the requested current geographic location of the first mobile device, dynamically generating a predetermined authorization zone based on the current geographic location of the first mobile device;
   responsive to receiving a second request for a second data access session from a second mobile device of a user, requesting a second current geographic location of the second mobile device;
   upon receiving a response including the requested second current geographic location of the second mobile device, determining whether the second current geographic location of the second mobile device is within the predetermined authorization zone; and
   upon determining that the second current geographic location of the second mobile device is within the predetermined authorization zone, automatically authorizing the user of the second mobile device for data access in accordance with the second request.

2. The method of claim 1, further comprising:
   when the current geographic location of the second mobile device is determined to not be within the predetermined authorization zone:
      determining a security level, from a plurality of security levels, for the user based on the second current geographic location of the second mobile device, wherein the security level for the user is based at least in part on a determination of whether the second current geographic location is within a predetermined restriction zone, the predetermined restriction zone corresponding to at least one of the plurality of security levels;
      when the second current geographic location of the second mobile device is determined to be within the predetermined restriction zone and also not within the predetermined authorization zone, prohibiting data access on the network for the user while the current geographic location remains in the predetermined restriction zone;
      when the current geographic location of the second mobile device is determined to be not within the predetermined restriction zone, requesting authorization information for selective authorization of the user based on the determined security level; and
      upon receiving the requested authorization information for selective authorization from the second mobile device, authorizing the user of the second mobile device for data access on the network in accordance with the second request based on the received authorization information.

3. The method of claim 1, wherein automatically authorizing the user of the second mobile device for data access further comprises:
   receiving authorization information associated with the user and the second mobile device;
   determining a time of prior successful authorization, associated with the predetermined authorization zone, based on the received authorization information associated with the user and the second mobile device;
   determining an access time period corresponding to a predetermined duration of time after the time of prior successful authorization during which the predetermined authorization zone remains valid for the user for purposes of automatic authorization; and
   if the access time period has not yet expired, automatically authorizing the user of the second mobile device for data access while the second mobile device of the user is within the predetermined authorization zone.

4. The method of claim 1, further comprising:
   responsive to receiving a third request for data access from the second mobile device following authorization of the user for data access in accordance with the second request, requesting an updated current geographic location for the second mobile device via the network;
   upon receiving the updated current geographic location of the second mobile device, determining whether the updated current geographic location of the second mobile device is within the predetermined authorization zone;

when the updated current geographic location of the second mobile device is determined to not be within the predetermined authorization zone:
revoking the user's authorization for data access; and
requesting authorization information for selective authorization of the user for data access.

5. The method of claim 2, wherein the authorization information requested for selective authorization of the user varies between each of the plurality of security levels.

6. The method of claim 5, wherein the plurality of security levels requires a multi-phase authorization procedure when the current geographic location of the second mobile device is determined to not be within the predetermined restriction zone, and requesting authorization information for selective authorization of the user comprises:
requesting authorization information for selective authorization of the user in accordance with the multi-phase authorization procedure involved in the security level.

7. The method of claim 1, wherein automatically authorizing the user of the second mobile device for data access comprises:
identifying the authorization information associated with the user of the second mobile device based on the device identifier; and
automatically authorizing the user of the second mobile device for data access based on the identified authorization information.

8. The method of claim 7, wherein automatically authorizing the user of the second mobile device further comprises:
determining whether the predetermined authorization zone is currently valid for automatic authorization based on the authorization information identified for the user of the second mobile device; and
automatically authorizing the user of the second mobile device for data access only when the predetermined authorization zone is determined to be currently valid for automatic authorization.

9. The method of claim 8, wherein the authorization information includes authorization credentials associated with the user and a timestamp associated with a prior successful authorization of the user using the authorization credentials, and the determination of whether the predetermined authorization zone is still valid includes determining whether the prior successful authorization occurred within a predetermined time period based on the timestamp.

10. A computer-implemented method for controlling authorization for mobile device users based on geographic location on a network, the method comprising:
responsive to receiving a request for a first data access session from a first mobile device, requesting a current geographic location of the first mobile device;
upon receiving a response including the requested current geographic location of the first mobile device, dynamically generating a predetermined authorization zone based on the current geographic location of the first mobile device;
responsive to receiving second input from a user requesting access to an application executable at a second mobile device, determining a second current geographic location of the second mobile device;
determining whether the second current geographic location of the second mobile device is within the predetermined authorization zone; and
upon determining that the second current geographic location of the second mobile device is within the predetermined authorization zone, automatically authorizing the user of the second mobile device for access to the application executable at the second mobile device in accordance with the input received from the user.

11. The method of claim 10, further comprising:
when the current geographic location of the second mobile device is determined to not be within the predetermined authorization zone:
determining a security level, from a plurality of security levels, for authorization of the user for access based on the second current geographic location of the second mobile device, wherein the security level for the user is based at least in part on a determination of whether the second current geographic location is within a predetermined restriction zone, the predetermined restriction zone corresponding to at least one of the plurality of security levels;
when the second current geographic location of the second mobile device is determined to be within the predetermined restriction zone, prohibiting access to the application executable at the second mobile device for the user while the current geographic location remains in the predetermined restriction zone;
when the current geographic location of the second mobile device is determined to not be within the predetermined restriction zone and also not within the predetermined authorization zone, requesting authorization information from the user for selective authorization of the user based on the determined security level; and
upon receiving input from the user including the requested authorization information for selective authorization, authorizing the user for access based on the received authorization information.

12. A system for automatic authorization of mobile device users based on geographic location, the system comprising:
a memory having processor-readable instructions stored therein; and
a processor configured to access the memory and execute the processor-readable instructions, which when executed by the processor configures the processor to perform a plurality of functions, including functions to:
receive a request for a first data access session from a first mobile device;
request a current geographic location of the first mobile device;
upon receiving a response including the requested current geographic location of the first mobile device, dynamically generating a predetermined authorization zone based on the current geographic location of the first mobile device;
receive a second request for a second data access session from a second mobile device of a user;
request a second current geographic location of the second mobile device;
determine whether the second current geographic location of the mobile device is within a predetermined authorization zone based on a received response including the requested current geographic location of the second mobile device; and
upon determining that the second current geographic location of the second mobile device is within the predetermined authorization zone, automatically authorize the user of the second mobile device for data access in accordance with the second request.

13. The system of claim 12, wherein the processor is further configured to perform functions to:
- when the current geographic location of the second mobile device is determined to not be within the predetermined authorization zone:
  - determine a security level, from a plurality of security levels, for the user based on the second current geographic location of the second mobile device, wherein the security level for the user is based at least in part on a determination of whether the second current geographic location is within a predetermined restriction zone, the predetermined restriction zone corresponding to at least one of the plurality of security levels;
  - when the second current geographic location of the mobile device is determined to be within the predetermined restriction zone, prohibit data access on the network for the user while the current geographic location remains in the predetermined restriction zone;
  - when the current geographic location of the second mobile device is determined to not be within the predetermined restriction zone and also not within the predetermined authorization zone, request authorization information for selective authorization of the user based on the determined security level; and
  - authorize the user of the second mobile device for data access on the network in accordance with the second request based on authorization information received from the mobile device.

14. The system of claim 12, wherein the processor including functions to automatically authorize the user of the second mobile device for data access further includes functions to:
- receive authorization information associated with the user and the second mobile device;
- determine a time of prior successful authorization, associated with the predetermined authorization zone, based on the received authorization information associated with the user and the second mobile device;
- determine an access time period corresponding to a predetermined duration of time after the time of prior successful authorization during which the predetermined authorization zone remains valid for the user for purposes of automatic authorization; and
- if the access time period has not yet expired, automatically authorizing the user of the second mobile device for data access while the second mobile device of the user is within the predetermined authorization zone.

15. The system of claim 12, wherein the second request for data access includes a device identifier associated with the second mobile device, and the processor is further configured to perform functions to:
- identify the second mobile device based on the device identifier; and
- send, to the identified mobile device via the network, a second request for the current geographic location of the mobile device.

16. The system of claim 12, wherein the processor is further configured to perform functions to:
- receive a third request for data access from the second mobile device following authorization of the user for data access in accordance with the second request;
- request an updated current geographic location for the second mobile device via the network based on the received third request;
- receive the updated current geographic location from the second mobile device in response;
- determine whether the updated current geographic location of the second mobile device is still within the predetermined authorization zone based on the received updated current geographic location of the second mobile device; and
- when the updated current geographic location of the second mobile device is determined to not be within the predetermined authorization zone:
  - revoke the user's authorization for data access; and
  - request authorization information for selective authorization of the user for data access.

17. The system of claim 12, wherein the authorization information includes authorization credentials associated with the user and a timestamp associated with a prior successful authorization of the user using the authorization credentials, and the processor is configured to perform functions to:
- determine whether the prior successful authorization occurred within a predetermined time period based on the timestamp; and
- determine whether the predetermined authorization zone is still valid upon a determination that the prior successful authorization occurred within the predetermined time period.

18. The system of claim 13, wherein the authorization information requested for selective authorization of the user varies between each of the plurality of security levels.

19. The system of claim 18, wherein the security level includes a multi-phase authorization procedure when the current geographic location of the mobile device is determined to not be within the predetermined restriction zone, and the processor is configured to perform functions to:
- request authorization information for selective authorization of the user in accordance with the multi-phase authorization procedure required by the security level.

* * * * *